United States Patent
Bertz et al.

(10) Patent No.: US 11,838,988 B2
(45) Date of Patent: Dec. 5, 2023

(54) WIRELESS USER EQUIPMENT (UE) CAPABILITY DATA TRANSFER BETWEEN WIRELESS COMMUNICATION NETWORKS

(71) Applicant: T-MOBILE INNOVATIONS LLC, Overland Park, KS (US)

(72) Inventors: Lyle T. Bertz, Lee's Summit, MO (US); Galip Murat Karabulut, Vienna, VA (US); Mark Richard Bales, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/053,009

(22) Filed: Nov. 7, 2022

(65) Prior Publication Data

US 2023/0067943 A1 Mar. 2, 2023

Related U.S. Application Data

(63) Continuation of application No. 17/220,499, filed on Apr. 1, 2021, now Pat. No. 11,523,271.

(51) Int. Cl.
*H04W 8/08* (2009.01)
*H04W 8/24* (2009.01)
*H04W 76/11* (2018.01)
*H04W 48/16* (2009.01)

(52) U.S. Cl.
CPC ............... *H04W 8/24* (2013.01); *H04W 8/08* (2013.01); *H04W 48/16* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 2019/0313239 A1* | 10/2019 | Horn | H04L 5/14 |
| 2020/0053554 A1 | 2/2020 | Kim et al. | |
| 2020/0351646 A1 | 11/2020 | Casati | |
| 2020/0351762 A1 | 11/2020 | Casati | |
| 2020/0404739 A1 | 12/2020 | Thiebaut et al. | |
| 2023/0189188 A1* | 6/2023 | Zhu | H04W 76/10 455/435.1 |

FOREIGN PATENT DOCUMENTS

| | | |
|---|---|---|
| WO | 2020225160 A1 | 11/2020 |
| WO | 2020250004 A1 | 12/2020 |
| WO | 2020250005 A1 | 12/2020 |
| WO | 2020256742 A1 | 12/2020 |
| WO | 2020260187 A1 | 12/2020 |

* cited by examiner

*Primary Examiner* — Said M Elnoubi

(57) ABSTRACT

A wireless communication network wirelessly receives a device Identifier (ID), network ID, and capability ID from a wireless user device. In response to the network ID, the wireless communication network transfers the device ID to the other communication network. The wireless communication network receives an authorization for the wireless user device from the other communication network. In response to the authorization, the wireless communication network wirelessly serves the wireless user device based on the capability ID. The wireless communication network transfers the capability ID used by the wireless user device to the other communication network in response to serving the wireless user device based on the capability ID.

20 Claims, 10 Drawing Sheets

WIRELESS USER EQUIPMENT (UE) CAPABILITY DATA TRANSFER BETWEEN WIRELESS COMMUNICATION NETWORKS

RELATED CASES

This United States Patent Application is a continuation of U.S. patent application Ser. No. 17/220,499 that was filed on Apr. 1, 2021 and is entitled "WIRELESS USER EQUIPMENT (UE) CAPABILITY DATA TRANSFER BETWEEN WIRELESS COMMUNICATION NETWORKS" U.S. patent application Ser. No. 17/220,499 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a robot may execute a machine-control application that communicates with a robot controller over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), Interworking functions (IWFs), User Plane Functions (UPFs), Network Exposure Functions (NEFs), Application Functions (AFs), and the like. The wireless communication networks may comprise Public Land Mobile Networks (PLMNs) that use different wireless access technologies and different radio frequency bands. The wireless network elements are grouped into different Dynamic Network Names (DNNs) and wireless network slices.

The wireless user devices come in different types that have different capabilities for radio technology, frequency, power, slice, application, and the like. The wireless user devices report their capabilities to the wireless communication networks. The wireless communication networks use the reported device capabilities to control the radio types, frequencies, power levels, slices, applications, and the like for the wireless user devices. To improve efficiency, the different sets of device capabilities for the different types of wireless user devices are mapped to capability IDs. The wireless communication networks can share the specific device capabilities for a specific wireless user device by sharing its capability ID instead of sharing the larger data set that describes all of the device capabilities. The device manufacturers and the wireless communication networks assign the capability IDs to the wireless user devices.

A User Equipment Capability Management Function (UCMF) stores the capability IDs for individual wireless user devices and stores the set of device capabilities for the individual capability IDs. Unfortunately, the wireless communication networks do not effectively share capability information for the wireless user devices. Moreover, home wireless communication networks may be unaware of the capability IDs that are assigned to their wireless user devices by visited wireless communication networks.

TECHNICAL OVERVIEW

A wireless communication network wirelessly receives a device Identifier (ID), network ID, and capability ID from a wireless user device. In response to the network ID, the wireless communication network transfers the device ID to the other communication network. The wireless communication network receives an authorization for the wireless user device from the other communication network. In response to the authorization, the wireless communication network wirelessly serves the wireless user device based on the capability ID. The wireless communication network transfers the capability ID used by the wireless user device to the other communication network in response to serving the wireless user device based on the capability ID.

DETAILED DESCRIPTION

Figure 1:
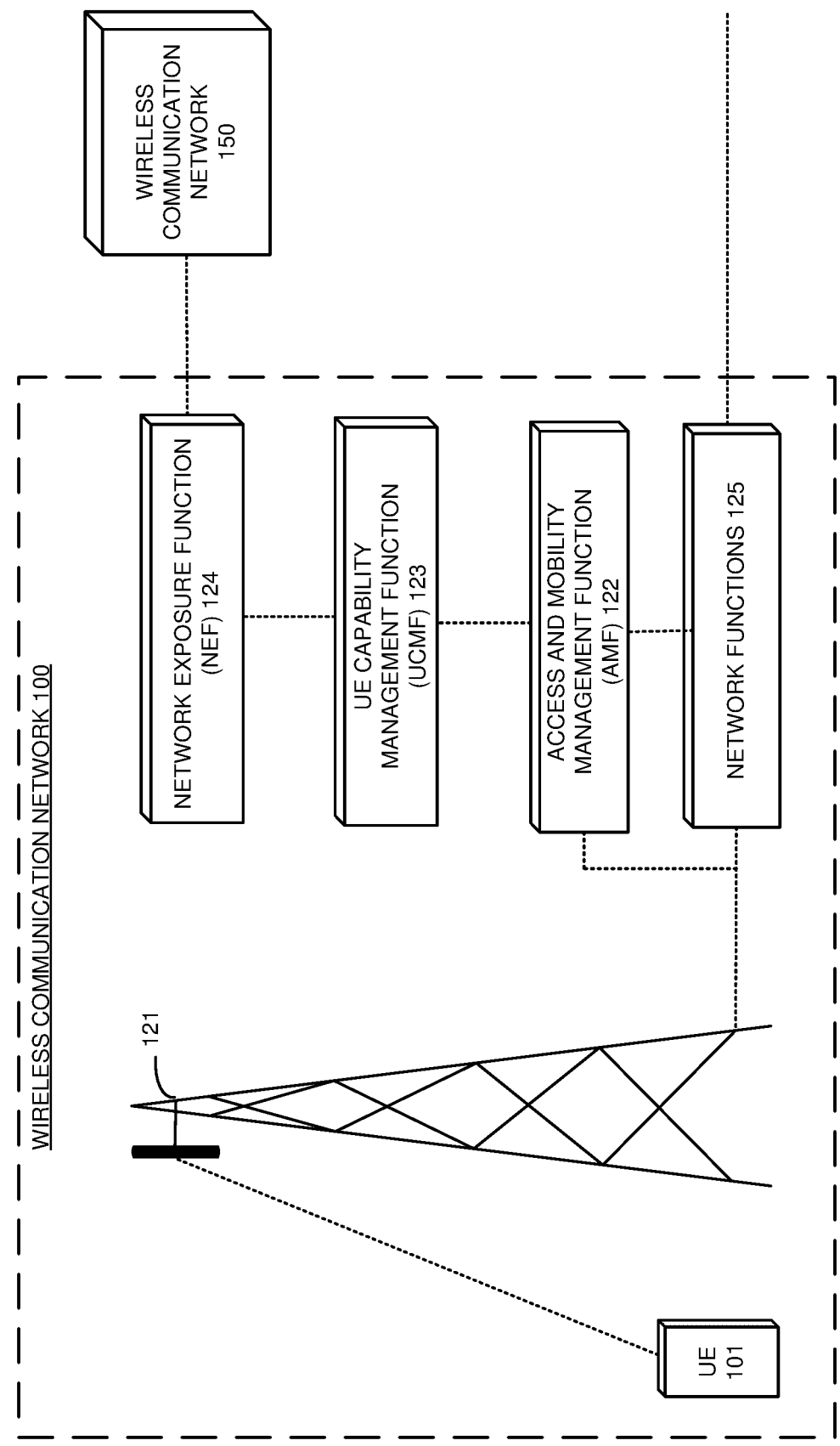
FIG. 1 illustrates a wireless communication network to transfer User Equipment (UE) capability data to another wireless communication network.

FIG. 1 illustrates wireless communication network 100 to transfer User Equipment (UE) capability data to wireless communication network 150. Wireless communication network 100 delivers services to UE 101 like internet-access, machine-control, media-streaming, or some other data communications product. UE 101 comprises a computer, phone, vehicle, sensor, robot, or some other data appliance with communication circuitry. Wireless communication network 100 comprises UE 101, Radio Access Network (RAN) 121, Access and Mobility Management Function (AMF) 122, UE Capability Management Function (UCMF) 123, Network Exposure Function (NEF) 124, and network functions 125. UE 101 is configured with UE capability data that indicates UE capabilities for Radio Access Technology (RAT) types, frequency bands, wireless network slice types, user applications, power ratings, UE class, Session Initiation Protocol (SIP) functionality, user applications, and other UE features. The UE capability data may comprise a UE Capability ID in Radio Capabilities Signaling Optimization (RACS) data.

Various examples of network operation and configuration are described herein. In some examples, UE 101 wirelessly attaches to RAN 121 and transfers UE capability data to AMF 122 over RAN 121. The UE capability data describes a set of UE capabilities or indicates a capability ID that is associated with the set of UE capabilities. UE 101 also indicates its UE Identifier (UE ID) and a network ID for network 150 to AMF 122. AMF 122 transfers the UE ID, network ID, and UE capability data to UCMF 123. In some examples, AMF 122 transfers the UE capability data to UCMF 123 in response to detecting that UE 101 is home to wireless communication network 150 and is visiting wireless communication network 100. UCMF 123 receives the UE ID, network ID, and UE capability data from AMF 122 and responsively transfers the UE ID, network ID, and UE capability data to NEF 124. In some examples, UCMF 123 transfers the UE capability data to NEF 124 in response to detecting that UE 101 is home to wireless communication network 150 and is visiting wireless communication network 100. UCMF 123 may modify the UE capability data like translating a UE capability set into a UE capability ID or translating one UE capability ID into another UE capability ID. NEF 124 receives the UE ID, network ID, and UE capability data, and in response, transfers the UE ID and the UE capability data to wireless communication network 150 based on the network ID. UE 101 transfers the UE ID, network ID, and additional UE capability data to AMF 122 over RAN 121. AMF 122 transfers the UE ID, network ID, and additional UE capability data to UCMF 123. In some examples, AMF 122 transfers the additional UE capability data to UCMF 123 in response to detecting that UE 101 is home to wireless communication network 150 and is visiting wireless communication network 100. NEF 124 receive a UE capability request for UE 101 from wireless communication network 150 and responsively transfers the UE capability request to UCMF 123. In response to the UE capability request, UCMF 123 responsively transfers the UE ID and the additional UE capability data to NEF 124. In alternative examples, UCMF 123 may transfer the UE ID, network ID, and additional UE capability data to NEF 124 in response to detecting that UE 101 is home to wireless communication network 150 and is visiting wireless communication network 100. NEF 124 transfers the UE ID and additional UE capability data to the wireless communication network 150 in response to the UE capability request.

Advantageously, wireless communication network 100 effectively shares UE capability information for UE 101 with wireless communication network 150. Moreover, wireless communication network 150 learns the UE capability IDs that are assigned to UE 101 when UE 101 visits wireless communication network 100.

UE 101 communicates with RAN 121 over technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, Narrowband Internet-of-Things (NB-IoT), and/or some other wireless networking protocol. The wireless communication technologies use electromagnetic frequencies in the low-band, mid-band, high-band, or some other portion of the electromagnetic spectrum. The communication links that interconnect wireless communication network 100 use metallic links, glass fibers, radio channels, or some other communication media. The communication links use IEEE 802.3 (ENET), Internet Protocol (IP), Time Division Multiplex (TDM), Data Over Cable System Interface Specification (DOCSIS), General Packet Radio Service Transfer Protocol (GTP), 3GPP, 5GNR, LTE, WIFI, virtual switching, inter-processor communication, bus interfaces, and/or some other data communication protocols. UE 101 communicates with AMF 122 and network functions 125 over RAN 121. UE 101 may also communicate with AMF 122 and network functions 125 over wireline access networks like Internet Service Providers (ISPs).

UE 101 and RAN 121 comprise antennas, amplifiers, filters, modulation, analog/digital interfaces, microprocessors, software, memories, transceivers, bus circuitry, and the like. AMF 122, UCMF 123, NEF 124, and network functions 125 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
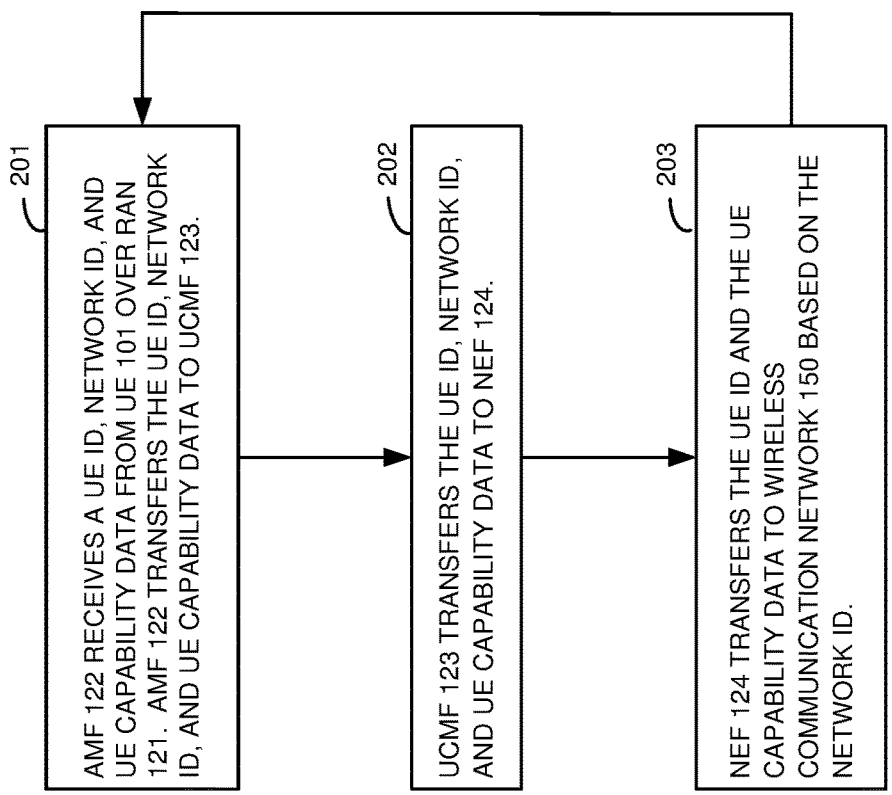
FIG. 2 illustrates an exemplary operation of the wireless communication network to transfer the UE capability data to the other wireless communication network.

FIG. 2 illustrates an exemplary operation of wireless communication network 100 to transfer the UE capability data to the wireless communication network 150. The operation may vary in other examples. AMF 122 receives a UE ID, network ID, and UE capability data from UE 101 over RAN 121 (201). AMF 122 transfers the UE ID, network ID, and UE capability data from to UCMF 123 (201). UCMF 123 transfers the UE ID, network ID, and UE capability data to NEF 124 (202). NEF 124 transfers the UE ID and the UE capability data to wireless communication network 150 based on the network ID (203). The process repeats (201).

Figure 3:
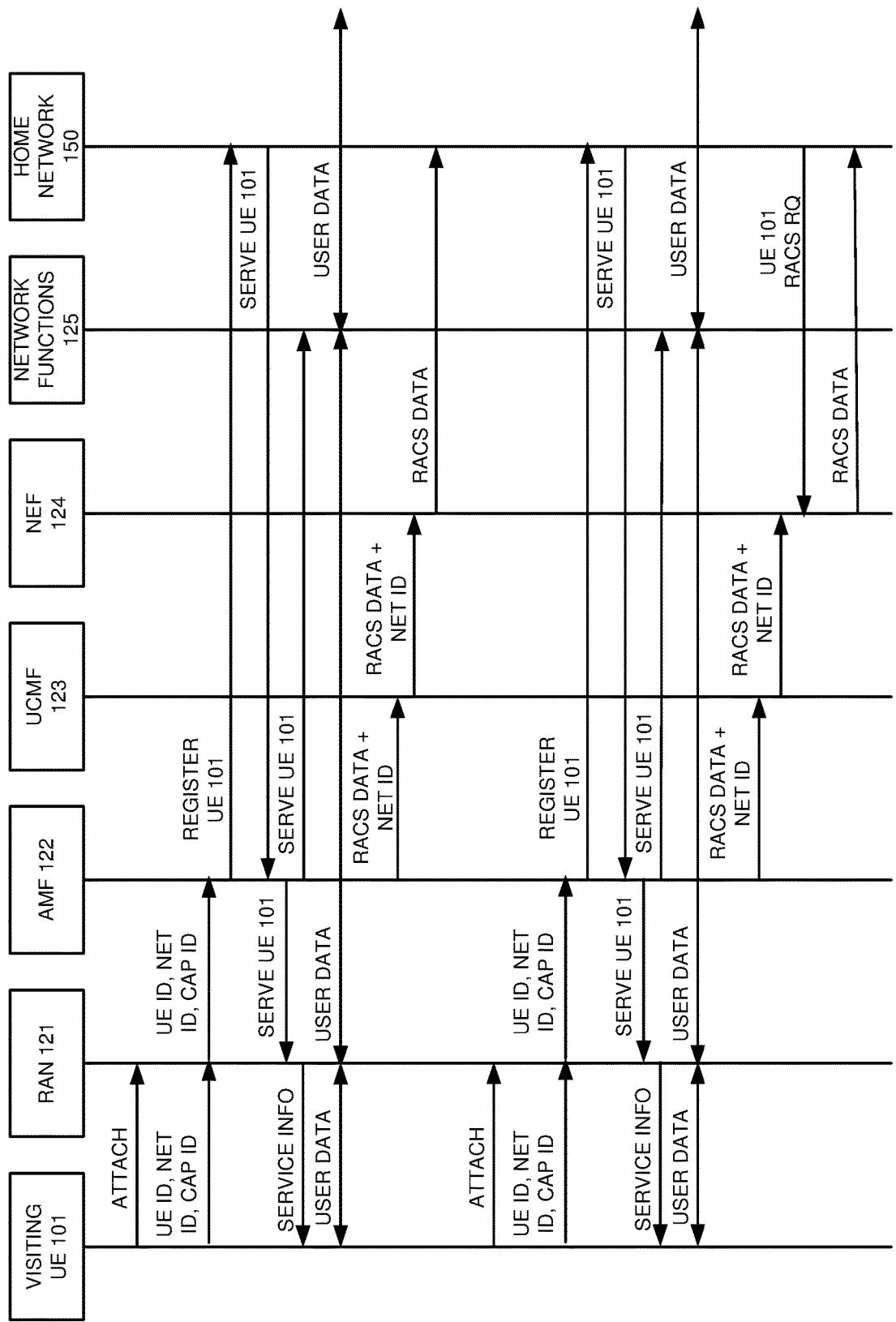
FIG. 3 illustrates an exemplary operation of the wireless communication network to transfer the UE capability data to the other wireless communication network.

FIG. 3 illustrates an exemplary operation of wireless communication network 100 to transfer the UE capability data to other wireless communication network 150. The operation may vary in other examples. In this example, UE 101 is home to network 150 and is visiting network 100. UE 101 wirelessly attaches to RAN 121 and registers with AMF 122 using a UE ID, network (NET) ID, and UE capability (CAP) ID. The UE capability ID is assigned by the UE manufacturer and may be reassigned by wireless communication networks 100 and 150. The UE capability ID is associated with a set of RAT types, frequency bands, network slices, user applications, and the like for UE 101. AMF 122 detects that UE 101 is visiting wireless communication network 100 from home wireless communication network 150 and attempts to register UE 101 over home network 150. UE 101 and home network 150 may exchange authentication data over AMF 122. Home network 150 instructs AMF 122 to serve UE 101. AMF 122 signals RAN 121 and network functions 125 to serve UE 101. RAN 121 signals service information to UE 101 like network addresses and quality parameters. UE 101 and RAN 121 exchange user data per the signaling. RAN 121 and network functions 125 exchange the user data per the signaling. Network functions 125 and external systems exchange the user data per the signaling. In response to detecting that UE 101 is visiting from home network 150, AMF 122 transfers the network ID and Radio Capabilities Signal Optimization (RACS) data to UCMF 123. The RACS data indicates the UE ID and UE capability ID. UCMF 123 may modify the UE capability ID. UCMF 123 transfers the network ID and the RACS data to NEF 124. The RACs data indicates the UE capability ID reported by UE 101 and any UE capability IDs used by network 100 to serve UE 101. NEF 124 transfers the RACS data to home wireless communication network 150 based on the network ID.

In another example, UE 101 wirelessly attaches to RAN 121 and registers with AMF 122 using the UE ID, network ID, and UE capability ID. AMF 122 detects that UE 101 is visiting wireless communication network 100 from home wireless communication network 150 and attempts to register UE 101 over home network 150. UE 101 and home network 150 may exchange authentication data over AMF 122. Home network 150 instructs AMF 122 to serve UE 101. AMF 122 signals RAN 121 and network functions 125 to serve UE 101. RAN 121 signals service information to UE 101 like network addresses and quality parameters. UE 101 and RAN 121 exchange user data per the signaling. RAN 121 and network functions 125 exchange the user data per the signaling. Network functions 125 and external systems exchange the user data per the signaling. In response to detecting that UE 101 is visiting from home network 150, AMF 122 transfers the network ID and RACS data to UCMF 123. The RACS data indicates the UE ID and UE capability ID. UCMF 123 may modify the UE capability ID. UCMF 123 transfers the network ID and the RACS data to NEF 124. NEF 124 receives a request (RQ) for UE 101 RACS data from home network 150, and responsively transfers the RACS data for UE 101 to home wireless communication network 150 based on the UE ID and the network ID.

Figure 4:
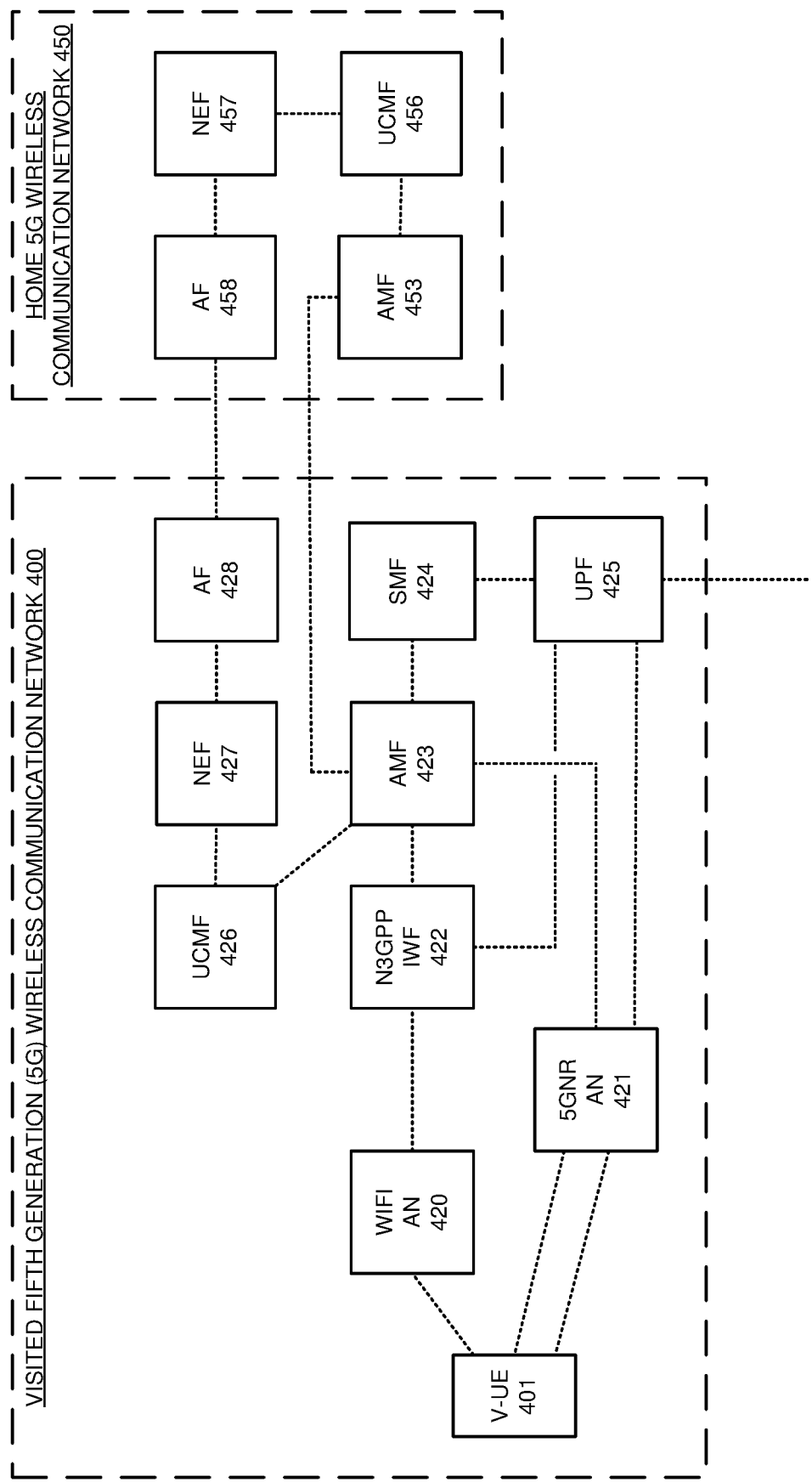
FIG. 4 illustrates a visited Fifth Generation (5G) wireless communication network to transfer UE capability data to a home 5G wireless communication network.

FIG. 4 illustrates visited Fifth Generation (5G) wireless communication network 400 to transfer UE capability data to home 5G wireless communication network 450. Visited 5G wireless communication network 400 comprises an example of wireless communication network 100, although network 100 may vary from this example. Visited 5G wireless communication network 400 comprises: visiting UE 401, WIFI AN 420, 5GNR AN 421, Non-Third Generation Partnership Project (N3GPP) IWF 422, Access and Mobility Management Function (AMF) 423, Session Management Function (SMF) 424, User Plane Function (UPF) 425, UE Capability Management Function (UCMF) 426, Network Exposure Function (NEF) 427, and Application Function (AF) 428. Home 5G wireless communication network 400 comprises AMF 453, UCMF 456, NEF 457, and AF 458.

In a first example, visited 5G network 400 pushes RACS data for visiting UE 401 to home network 450. Visiting UE 401 wirelessly attaches to WIFI AN 420. Visiting UE 401 attaches to N3IWF 422 over WIFI AN 420. Visiting UE 401 registers with AMF 423 over AN 420 and IWF 422. Visiting UE 401 transfers its Subscriber Concealed Identifier (SUCI), home Public Land Mobile Identifier (PLMN) ID, and UE capability ID to AMF 423. The UE capability ID is initially assigned by the manufacturer of UE 401 and is associated with a set of UE features for RAT types, frequency bands, network slices, user applications, and the like. AMF 423 detects that visiting UE 401 is from home wireless communication network 450 based on the PLMN ID and attempts to register UE 401 over home AMF 453. Home AMF 453 may authenticate the SUCI for UE 401 and may exchange authentication data with visiting UE 401 over visited AMF 423. Home AMF 453 instructs visited AMF 423 to serve visiting UE 401. Visited AMF 423 signals N3IWF 422 and SMF 424 to serve UE 401. SMF 424 signals UPF 425 to serve UE 401. AMF 423 signals service information to UE 401 like network addresses and quality parameters. Visiting UE 401 and WIFI AN 420 exchange user data per the signaling. WIFI AN 420 and N3GPP IWF 422 exchange the user data per the signaling. N3GPP IWF 422 and UPF 425 exchange the user data per the signaling. UPF 425 and external systems exchange the user data per the signaling. In response to detecting that visiting UE 401 is from home network 450, AMF 423 transfers the PLMN ID for network 450 and Radio Capabilities Signal Optimization (RACS) data for visiting UE 401 to UCMF 426. The RACS data indicates the SUCI, International Mobile Equipment Identifier (IMEI), and both the reported and used UE capability IDs. UCMF 426 may change the UE capability ID when serving UE 401. UCMF 426 transfers the PLMN ID and the RACS data for visiting UE 401 to NEF 427. NEF 427 transfers the PLMN ID and the RACS data for visiting UE 401 to AF 428 over a northbound interface. Based on the PLMN ID, AF 428 transfers the RACS data for visiting UE 401 to home AF 458 in home wireless communication network 450. Home AF 458 transfers the RACS data for visiting UE 401 to home NEF 457, and NEF 457 transfers the RACS data for visiting UE 401 to UCMF 456. UCMF 456 serves the RACS data to multiple consumers. AFs 428 and 458 could be omitted and NEFs 427 and 457 could communicate directly.

In a second example, home 5G network 450 pulls RACS data for visiting UE 401 from visited network 400. Home UCMF 456 subscribes to RACS data for UE 401 from home NEF 457 when UE 401 is visiting other networks. Home NEF 457 subscribes to RACS data for UE 401 from visited NEF 427 over AFs 428 and 458. Visiting UE 401 wirelessly attaches to 5GNR AN 421. Visiting UE 401 registers with AMF 423 over 5GNR AN 421. Visiting UE 401 transfers its SUCI, home PLMN ID, and UE capability ID to AMF 423. The UE capability ID is associated with a set of UE features for RAT types, frequency bands, network slices, user applications, and the like. AMF 423 detects that visiting UE 401 is from home wireless communication network 450 based on the home PLMN ID and attempts to register UE 401 over AMF 453. AMF 453 may authenticate the SUCI for UE 401 and may exchange authentication data with visiting UE 401 over AMF 423. Home AMF 453 instructs visited AMF 423 to serve visiting UE 401. AMF 423 signals 5GNR AN 421 and SMF 424 to serve visiting UE 401. SMF 424 signals UPF 425 to serve UE 401. 5GNR AN 421 and AMF 423 signal service information to UE 401 like network addresses and quality parameters. Visiting UE 401 and 5GNR AN 421 exchange user data per the signaling. 5GNR AN 421 and UPF 425 exchange the user data per the signaling. UPF 425 and external systems exchange the user data per the signaling. In response to detecting that visiting UE 401 is from home network 450, AMF 423 transfers the PLMN ID for network 450 and RACS data for visiting UE 401 to UCMF 426. The RACS data indicates the SUCI, IMEI, and UE capability ID. In response to the RACS subscription, NEF 427 transfers the RACS data for visiting UE 401 to NEF 457 over AFs 428 and 458. In response to the RACS subscription, NEF 457 transfers the RACS data for visiting UE 401 to UCMF 456. UCMF 456 serves the RACS data to multiple consumers. AFs 428 and 458 could be omitted and NEFs 427 and 457 could communicate directly.

Visited 5G wireless communication network 400 may push RACS data for visiting UE 401 to home wireless communication network 450 when UE 401 attaches to WIFI AN 420 and/or 5GNR AN 421. Likewise, home 5G wireless communication network 450 may pull RACS data for visiting UE 401 from visiting wireless communication network 400 when UE 401 attaches to WIFI AN 420 and/or 5GNR AN 421. Using the push and/or pull technique, home UCMF 456 maintains live RACS data for UE 401 when UE 401 visits access nodes 420-421 in 5G network 500.

Figure 5:
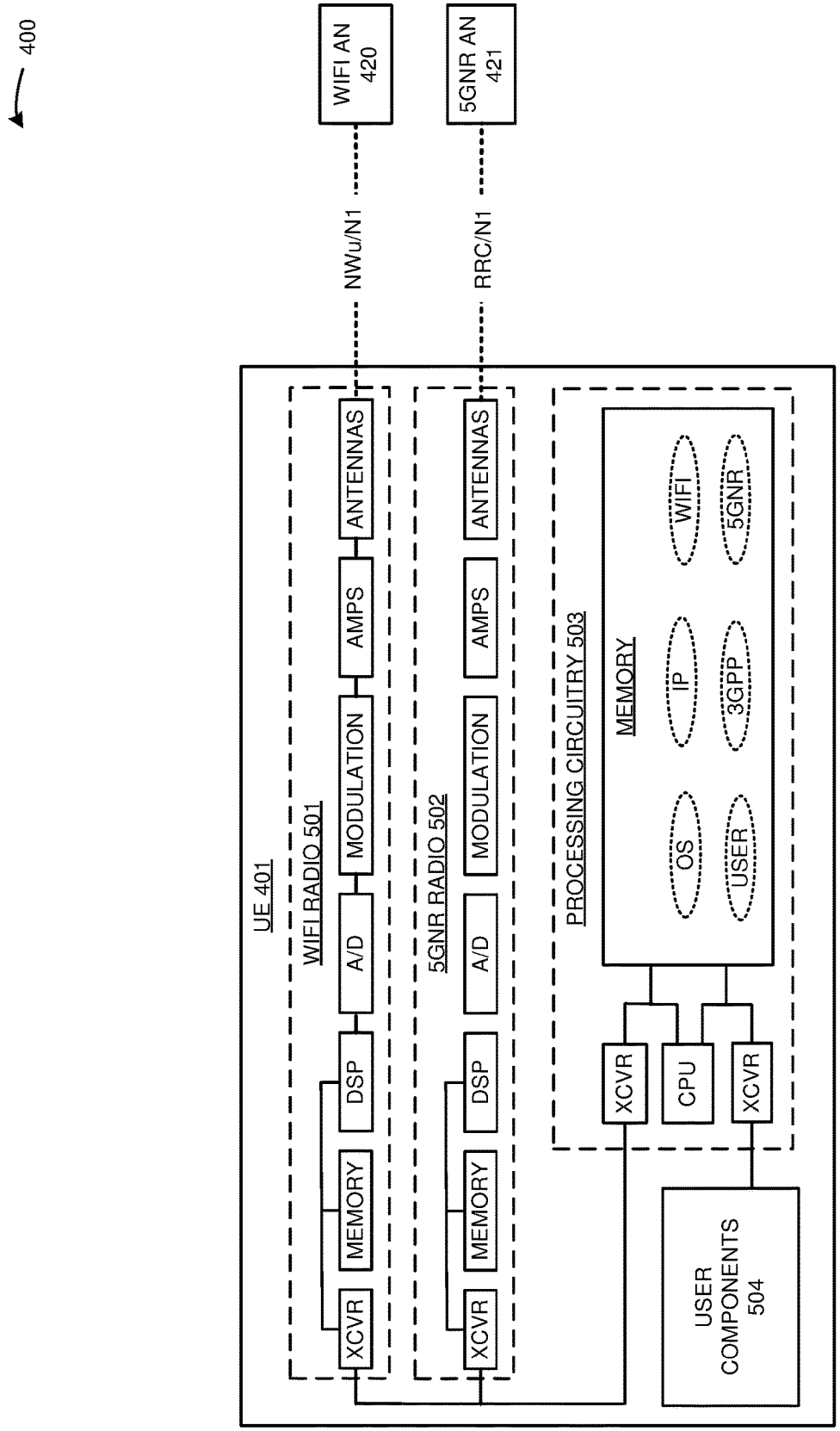
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises WIFI radio 501, 5GNR radio 502, processing circuitry 503, and user components 504. Radios 501-502 comprise antennas, amplifiers, filters, modulation, analog-to-digital interfaces, DSP, memory, and transceivers that are coupled over bus circuitry. Processing circuitry 503 comprises memory, CPU, user interfaces and components, and transceivers that are coupled over bus circuitry. The memory in processing circuitry 503 stores an operating system, user applications (USER), and network applications for IP, 3GPP, WIFI, and 5GNR. The network applications include physical layer, media access control, link control, convergence and adaption, radio resource control, and the like. The antennas in WIFI radio 501 are wirelessly coupled to WIFI AN 420 over a WIFI link that supports NWu and N1. The antennas in 5GNR radio 502 are wirelessly coupled to 5GNR AN 421 over a 5GNR link that supports RRC and N1. Transceivers (XCVRs) in radios 501-502 are coupled to transceivers in processing circuitry 503. Transceivers in processing circuitry 503 are coupled to user components 504 like displays, controllers, and memory. The CPU in processing circuitry 503 executes the operating system, user applications, and network applications to exchange network signaling and user data with respective ANs 420-421 over respective radios 501-502.

Figure 6:
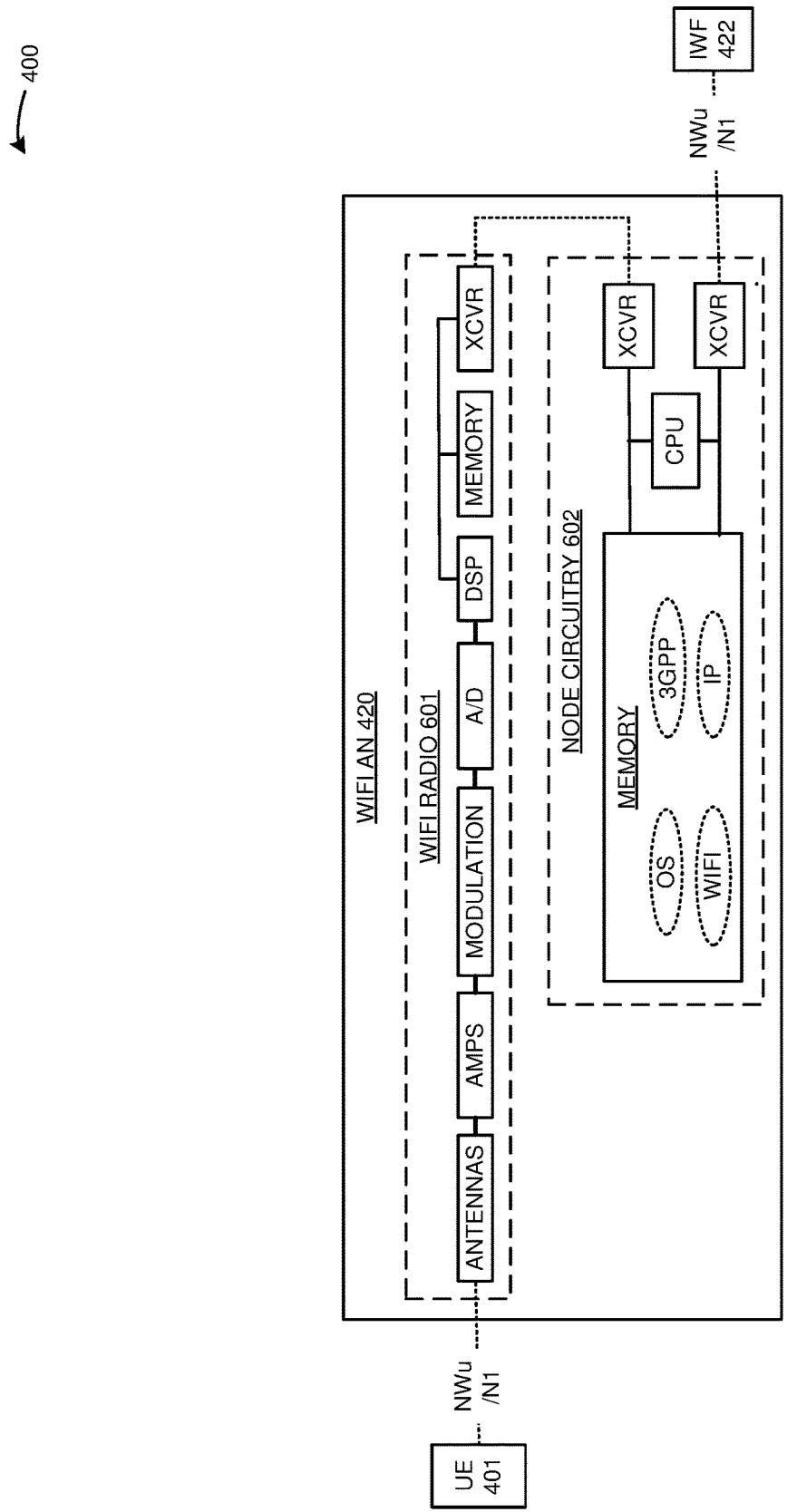
FIG. 6 illustrates the WIFI access node in the 5G wireless communication network.

FIG. 6 illustrates WIFI AN 420 in 5G wireless communication network 400. WIFI AN 420 comprises an example of RAN 121, although RAN 121 may differ. WIFI AN 420 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, and transceivers that are coupled over bus circuitry. The memory in node circuitry 602 stores operating systems and network applications for IP, WIFI, and 3GPP like physical layer, media access control, link control, and the like. The antennas in WIFI radio 601 are wirelessly coupled to UE 401 over wireless links that support NWu and N1. Transceivers in WIFI radio 601 are coupled to transceivers in node circuitry 602, and transceivers in node circuitry 602 are coupled to transceivers in IWF 422 over links that support NWu and N1. The CPU in node circuitry 602 executes the operating system and network applications to exchange data and signaling with UE 401 and to exchange data and signaling with IWF 422.

Figure 7:
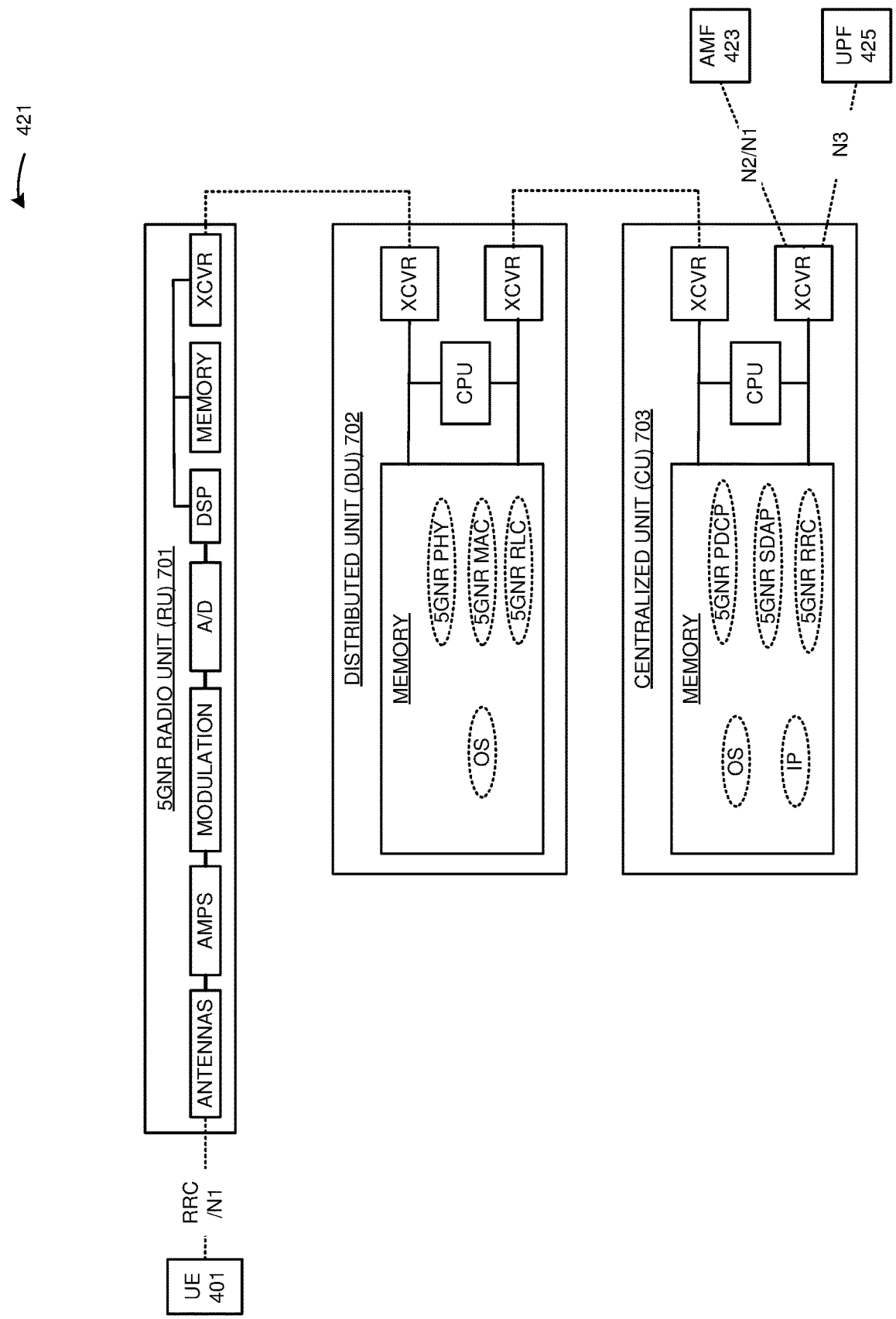
FIG. 7 illustrates the LTE access node in the 5G wireless communication network.

FIG. 7 illustrates 5GNR AN 421 in 5G wireless communication network 400. 5GNR AN 421 comprises an example of RAN 121, although RAN 121 may differ. 5GNR AN 421 comprises 5GNR Radio Unit (RU) 701, 3GPP Distributed Unit (DU) 702, and 3GPP Centralized Unit (CU) 703. 5GNR RU 701 comprises antennas, amplifiers, filters, modulation, analog-to-digital interfaces, DSP, memory, and transceivers that are coupled over bus circuitry. DU 702 comprises memory, CPU, and transceivers that are coupled over bus circuitry. The memory in DU 702 stores operating systems and 5GNR network applications that include Physical Layer (PHY), Media Access Control (MAC), Radio Link Control (RLC), and the like. CU 703 comprises memory, CPU, and transceivers that are coupled over bus circuitry. The memory in CU 703 stores an operating system and network applications for IP and 5GNR that include Packet Data Convergence Protocol (PDCP), Service Data Adaption Protocol (SDAP), Radio Resource Control (RRC), and the like. The antennas in RU 701 are wirelessly coupled to UE 401 over 5GNR links that use various frequency bands and that support RRC and N1. Transceivers in RU 701 are coupled to transceivers in DU 702 over fronthaul links like enhanced Common Public Radio Interface (eCPRI). Transceivers in DU 702 coupled to transceivers in CU 703 over mid-haul links. Transceivers in CU 703 are coupled to AMF 423 and UPF 427 over backhaul links. The CPU in DU 703 executes an operating system and network applications to exchange 5GNR data units with RU 701 and to exchange 5GNR data units with CU 703. The CPU in CU 703 executes an operating system and network applications to exchange the 5GNR data units with DU 702, exchange N2/N1 signaling with AMF 423, and exchange N3 data with UPF 427.

Figure 8:
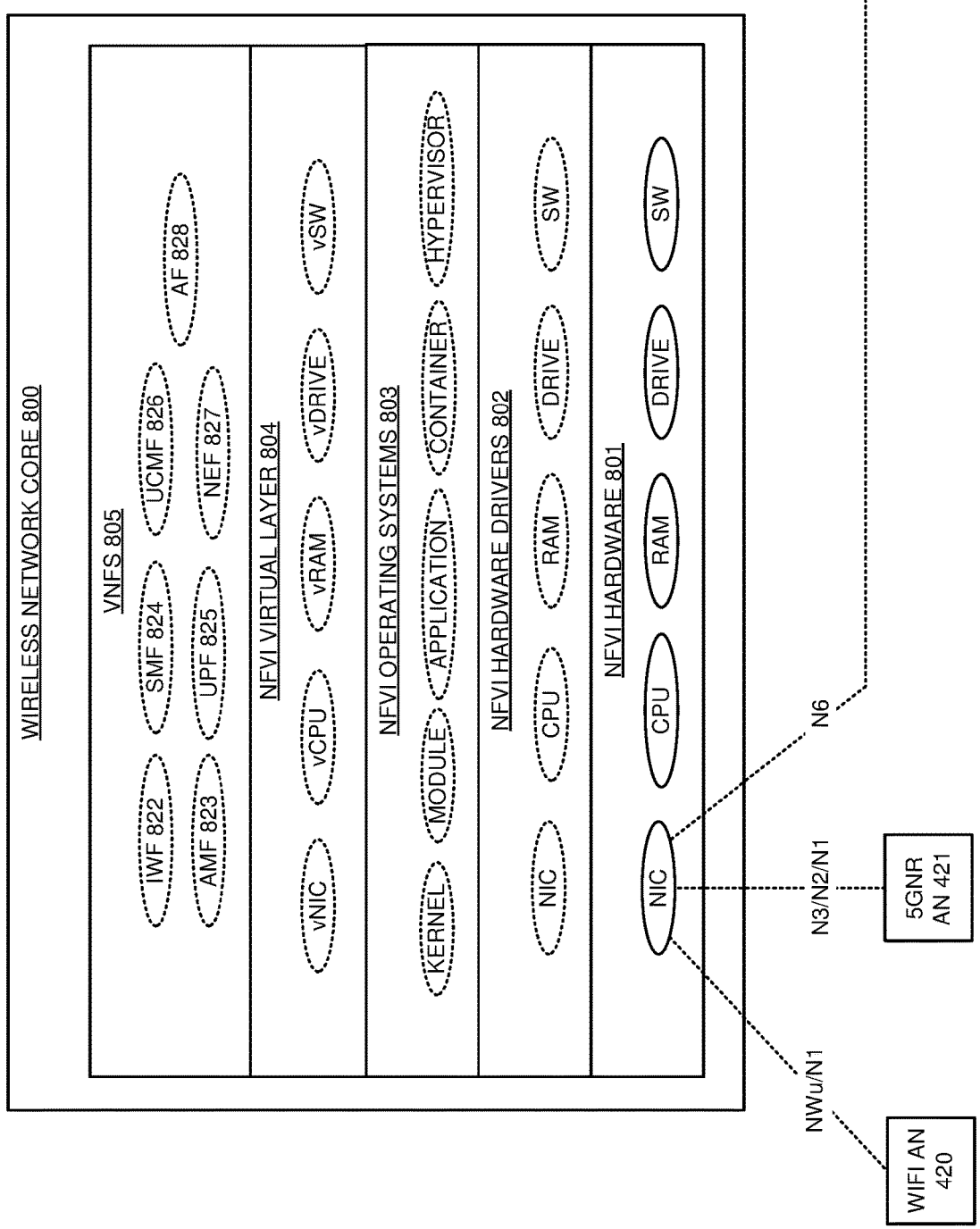
FIG. 8 illustrates a wireless network core in the 5G wireless communication network.

FIG. 8 illustrates wireless network core 800 in 5G wireless communication network 400. Network core 800 comprises an example of AMF 122, UCMF 123, NEF 124, and network functions 125, although AMF 122, UCMF 123, NEF 124, and functions 125 may differ. Network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise Non-3GPP Interworking Function (IWF) 822, Access and Mobility Management Function (AMF) 823, Session Management Function (SMF) 824, User Plane Function (UPF) 825, UE Capability Management Function (UCMF) 826, Network Exposure Function (NEF) 827, and Application Function (AF) 828. Other VNFs like Authentication Server Function (AUSF) and Network Repository Function (NRF) are typically present but are omitted for clarity. Network core 800 may be located at a single site or be distributed across multiple geographic locations. The NIC in NFVI hardware 801 are coupled to ANs 420-421 over data links that support NWu, N3, N2, and N1. The NIC in NFVI hardware 801 are coupled to external data systems over data links that support N6. NFVI hardware 801 executes NFVI hardware drivers 802, NFVI operating systems 803, NFVI virtual layer 804, and NFVI VNFs 805 to form and operate IWF 422, AMF 423, SMF 424, UPF 425, UCMF 426, NEF 427, and AF 428.

Figure 9:
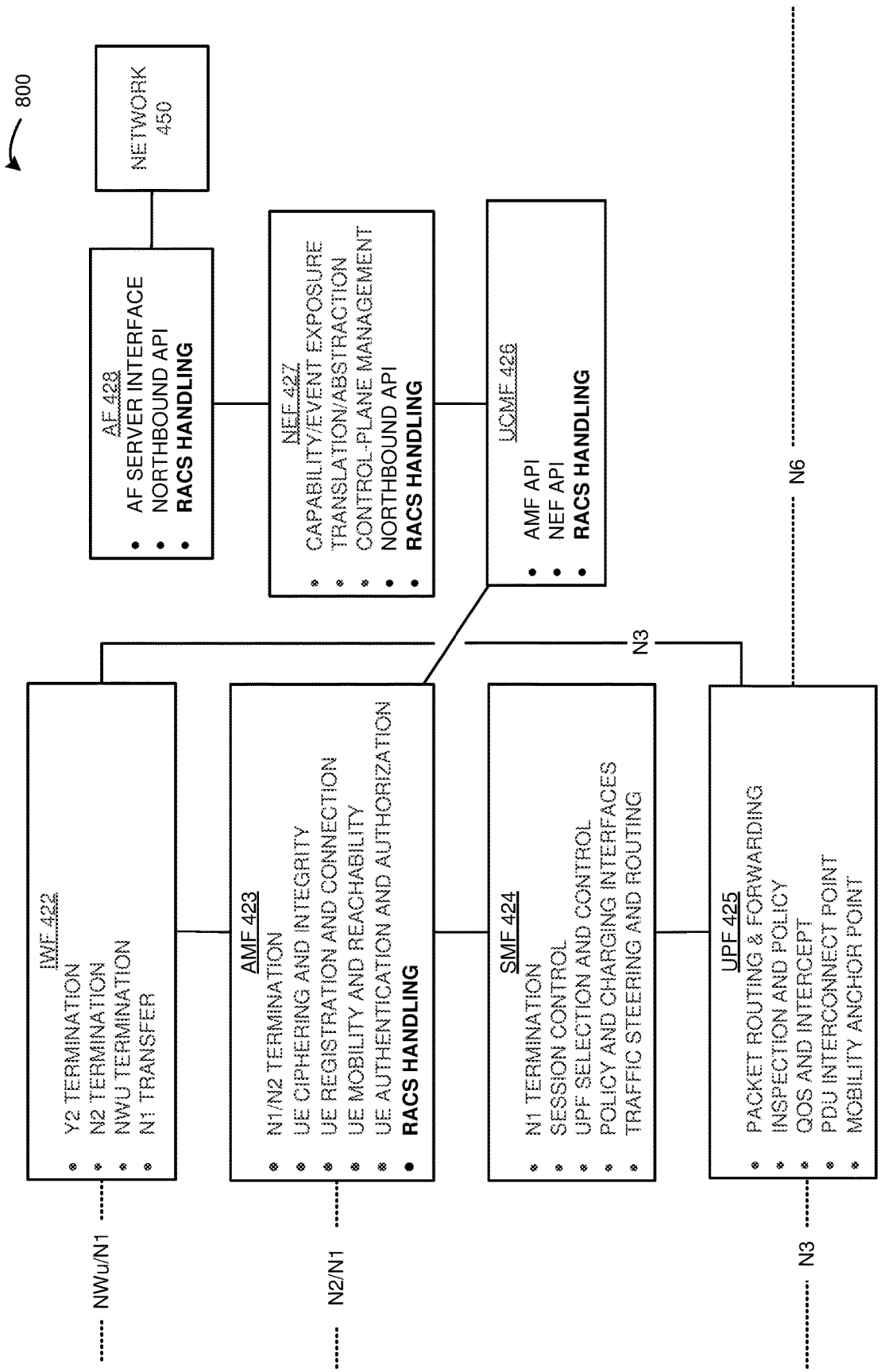
FIG. 9 further illustrates the wireless network core in the 5G wireless communication network.

FIG. 9 further illustrates wireless network core 800 in 5G wireless communication network 400. IWF 422 performs Y2 termination, N2 termination, NWu termination, and N1 transfer. AMF 423 performs N1 termination, N2 termination, UE ciphering & integrity protection, UE registration and connection, UE mobility and reachability, UE authentication and authorization, and RAC's handling. SMF 424 performs N1 termination, session establishment/management, UPF selection and control, policy and charging control and traffic steering and routing. UPF 425 performs packet routing & forwarding, packet inspection and policy, QoS handling and lawful intercept, PDU interconnection, and mobility anchoring. UCMF 426 manages UE capabilities over AMF APIs and NEF APIs and performs RACS handling. NEF 427 performs capability and event exposure, data translation/abstraction, control-plane management, AF interaction over the northbound API, and RACs handling, AF 428 interacts with NEF 424 over the northbound API, communicates with network 450 and performs RACs handling.

Figure 10:
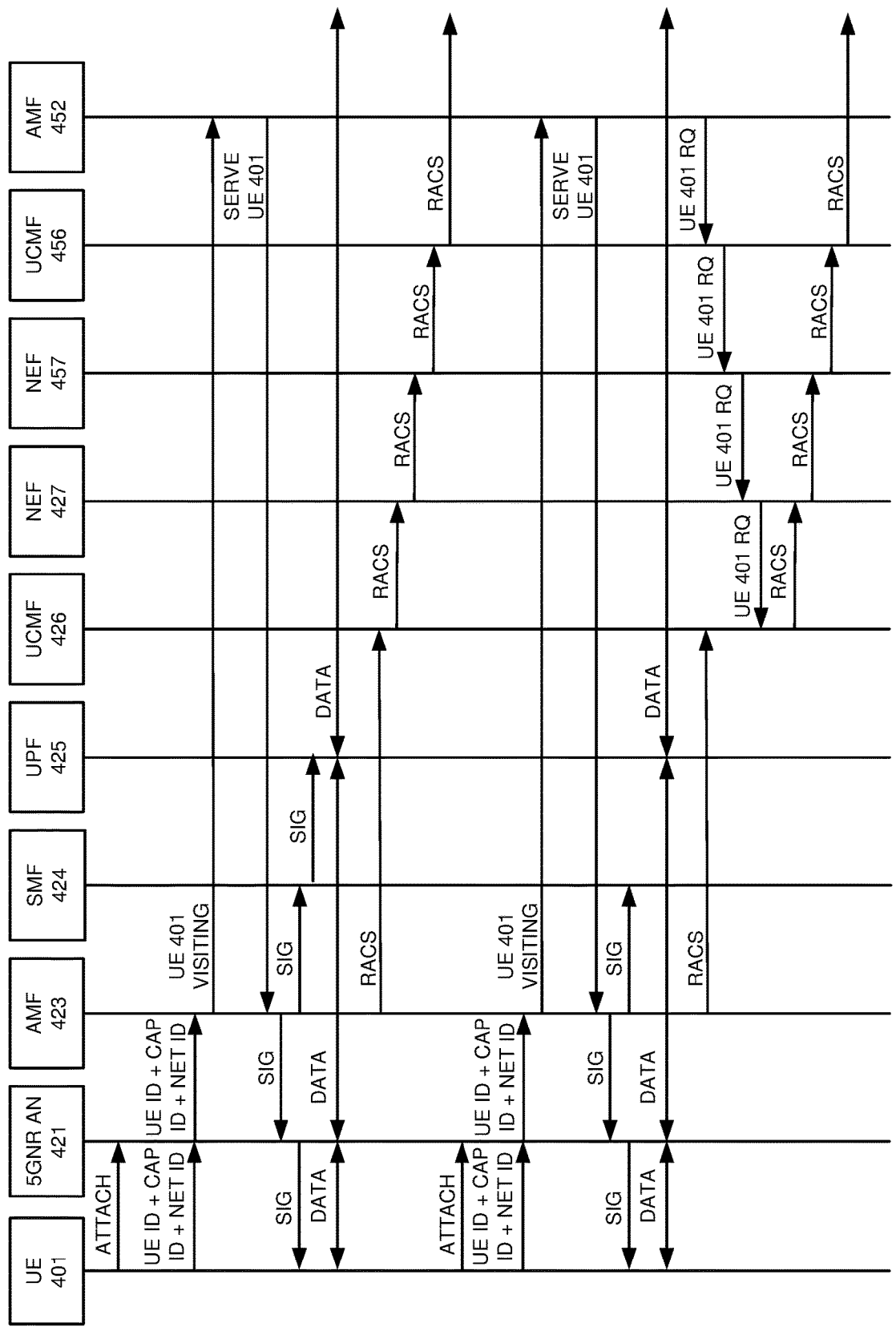
FIG. 10 illustrates an exemplary operation of the visited 5G wireless communication network to transfer the UE capability data to the home wireless communication network.

FIG. 10 illustrates an operation of 5G wireless communication network 400 to transfer the UE capability data to wireless communication network 450. In the following examples, AFs 428 and 458 are omitted and NEFs 427 and 457 directly exchange RACs data. In the first example, visited UCMF 426 pushes RACS data for visiting UE 401 to home UCMF 456. In a second example, home UCMF 456 pulls RACS data for visiting UE 401 from visiting UCMF 426.

In the first example, visiting UE 401 wirelessly attaches to 5GNR AN 421. Visiting UE 401 registers with AMF 423 over 5GNR AN 421. Visiting UE 401 transfers a SUCI, IMEI, PLMN ID, and UE capability ID to AMF 423. In this example, the UE capability ID is assigned by the manufacturer of UE 401 and is associated with a set of UE features for RAT types, frequency bands, network slices, user applications, and the like that are supported by UE 401. AMF 423 detects that visiting UE 401 is from home wireless communication network 450 based on the PLMN ID and attempts to register UE 401 over home AMF 453. Home AMF 453 may authenticate the SUCI for UE 401 and may exchange authentication data with visiting UE 401 over visited AMF 423. Home AMF 453 instructs visited AMF 423 to serve visiting UE 401. Visited AMF 423 signals 5GNR AN 421 and SMF 424 to serve UE 101. SMF 424 signals UPF 425 to serve UE 401. 5GNR AN 421 and AMF 423 signal service information to UE 401 like network addresses and quality parameters. Visiting UE 401 and 5GNR AN 421 exchange user data per the signaling. 5GNR AN 421 and UPF 425 exchange the user data per the signaling. UPF 425 and external systems exchange the user data per the signaling. In response to detecting that visiting UE 401 is from home network 450, AMF 423 transfers the PLMN ID for network 450 and the RACS data for visiting UE 401 to UCMF 426. The RACS data indicates SUCI, IMEI, and the UE capability ID. UCMF 426 may modify the UE capability ID for service delivery. UCMF 426 transfers the PLMN ID and the RACS data for visiting UE 401 to NEF 427. NEF 427 transfers the PLMN ID and the RACS data for visiting UE 401 to NEF 457 based on the PLMN ID. NEF 457 transfers the RACS data for visiting UE 401 to UCMF 456. UCMF 456 serves the RACS data for visiting UE 401 to various consuming entities.

In the second example, home UCMF 456 subscribes to RACS data for UE 401 from home NEF 457 when UE 401 is visiting other networks. Home NEF 457 subscribes to RACS data for UE 401 from visited NEF 427. Visiting UE 401 wirelessly attaches to 5GNR AN 421. Visiting UE 401 registers with AMF 423 over 5GNR AN 421. Visiting UE 401 transfers its UE ID, PLMN ID, and UE capability ID to AMF 423. AMF 423 detects that visiting UE 401 is from home wireless communication network 450 based on the home PLMN ID and attempts to register UE 101 over AMF 453. AMF 453 may authenticate the SUCI for UE 401 and may exchange authentication data with visiting UE 401 over AMF 423. Home AMF 453 instructs visited AMF 423 to serve visiting UE 401. AMF 423 signals 5GNR AN 421 and SMF 424 to serve visiting UE 401. SMF 424 signals UPF 425 to serve UE 401. 5GNR AN 421 and AMF 423 signal service information to UE 401 like network addresses and quality parameters. Visiting UE 401 and 5GNR AN 421 exchange user data per the signaling. 5GNR AN 421 and UPF 425 exchange the user data per the signaling. UPF 425 and external systems exchange the user data per the signaling. In response to detecting that visiting UE 401 is from home network 450, AMF 423 transfers the PLMN ID for network 450 and RACS data for visiting UE 401 to UCMF 426. The RACS data indicates the UE ID and UE capability ID(s). In response to the RACS subscription for UE 401, NEF 427 transfers the RACS data for visiting UE 401 to NEF 457. In response to the RACS subscription for UE 401, NEF 457 transfers the RACS data for visiting UE 401 to UCMF 456. UCMF 456 serves the RACS data for visiting UE 401 to various consuming entities.

The wireless data network circuitry described above comprises computer hardware and software that form special-purpose network circuitry to export UE capability data to other data communication networks like home wireless networks. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to export UE capability data to other data communication networks like home wireless networks. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of transferring a capability Identifier (ID) from a wireless user device to a communication network, the method comprising:

wirelessly receiving a device ID, a network ID, and the capability ID from the wireless user device, and in response to the network ID, transferring the device ID to the communication network;

receiving an authorization for the wireless user device from the communication network, and in response, wirelessly serving the wireless user device based on the capability ID; and in response to serving the wireless user device based on the capability ID, transferring the capability ID used by the wireless user device to the communication network.

2. The wireless communication network of claim 1 wherein the capability ID indicates at least one Radio Access Technology (RAT) type used by the wireless user device.

3. The wireless communication network of claim 1 wherein the capability ID indicates at least one frequency band used by the wireless user device.

4. The wireless communication network of claim 1 wherein the capability ID indicates at least one wireless network slice used by the wireless user device.

5. The wireless communication network of claim 1 wherein the capability ID indicates at least one user application used by the wireless user device.

6. The method of claim 1 wherein the communication network comprises a Public Land Mobile Network (PLMN).

7. The method of claim 1 wherein the communication network comprises a home network for the wireless user device.

8. A method of operating a wireless communication network to transfer a capability Identifier (ID) from a wireless user device to another communication network, the method comprising:

a Radio Access Network (RAN) wirelessly receiving a device ID, a network ID, and the capability ID from the wireless user device and transferring the device ID, the network ID, and the capability ID to an Access and Mobility Management Function (AMF);

the AMF receiving the device ID, the network ID, and the capability ID, and in response, authorizing the device ID with the other communication network based on the network ID and signaling the RAN to wirelessly serve the wireless user device based on the capability ID;

the RAN wirelessly serving the wireless user device based on the capability ID; and the AMF transferring the device ID and the capability ID to the other communication network in response to the RAN serving the wireless user device based on the capability ID.

9. The wireless communication network of claim 8 wherein the capability ID indicates at least one Radio Access Technology (RAT) type used by the wireless user device.

10. The wireless communication network of claim 8 wherein the capability ID indicates at least one frequency band used by the wireless user device.

11. The wireless communication network of claim 8 wherein the capability ID indicates at least one wireless network slice used by the wireless user device.

12. The wireless communication network of claim 8 wherein the capability ID indicates at least one user application used by the wireless user device.

13. The wireless communication network of claim 8 wherein the wireless communication network and the other communication network comprises different Public Land Mobile Networks (PLMNs).

14. The method of claim 8 wherein:

the wireless communication network comprises a visited network for the wireless user device; and the other communication network comprises a home network for the wireless user device.

15. A wireless communication network to transfer Radio Capabilities Signaling Optimization (RACS) data from a wireless user device to another communication network, the method comprising:

a Radio Access Network (RAN) configured to wirelessly receive the RACS data from the wireless user device and transfer the RACS data to an Access and Mobility Management Function (AMF);

the AMF configured to transfer a device ID to the other communication network based on the RACS data, receive a response from the other communication network, and transfer signaling to the RAN to wirelessly serve the wireless user device based on the RACS data;

the RAN configured to wirelessly serve the wireless user device based on the RACS data responsive to the signaling; and the AMF configured to transfer the RACS data for the wireless user device to the other communication network in response to the RAN wirelessly serving the wireless user device based on the RACS data.

16. The wireless communication network of claim 15 wherein the RACS data indicates at least one Radio Access Technology (RAT) type used by the wireless user device.

17. The wireless communication network of claim 15 wherein the RACS data indicates at least one frequency band used by the wireless user device.

18. The wireless communication network of claim 15 wherein the RACS data indicates at least one wireless network slice used by the wireless user device.

19. The wireless communication network of claim 15 wherein the RACS data indicates at least one user application used by the wireless user device.

20. The wireless communication network of claim 15 wherein the wireless communication network and the other communication network comprise different Public Land Mobile Networks (PLMNs).

* * * * *